United States Patent [19]

Skala

[11] 4,417,252

[45] Nov. 22, 1983

[54] FLUID DRIVE FOR AN ORIFICE BAND INK JET PRINTER

[76] Inventor: Stephen F. Skala, 3839 S. Wenonah Ave., Berwyn, Ill. 60402

[21] Appl. No.: 385,915

[22] Filed: Jun. 7, 1982

Related U.S. Application Data

[63] Continuation-in-part of Ser. No. 353,640, Mar. 1, 1982.

[51] Int. Cl.[3] ........................ G01D 9/00; G01D 15/18

[52] U.S. Cl. ........................................ 346/1.1; 346/75

[58] Field of Search .......................... 346/1.1, 75, 140

[56] References Cited

U.S. PATENT DOCUMENTS 3,913,719 10/1975 Frey ................................ 346/1.1 X 3,971,040 7/1976 Skala .................................... 346/75

*Primary Examiner*—Donald A. Griffin

*Attorney, Agent, or Firm*—Stephen F. Skala

[57] ABSTRACT

In an orifice band ink jet printer, smooth motion of an orifice band and its isolation from solid structures is desirable for uniform ink drop formation. But prior means for smoothly driving isolated movable members do not provide the precise synchronism of speed and phase in an aligned path which is needed for good image synthesis. Such precise and smooth motion is attained according to the invention by a servo system which includes a forced flow of liquid ink along the orifice band to provide a principal driving force and a rapidly responsing auxiliary drive to provide a supplemental force to maintain synchronous speed and phase of the orifice band. Occurrence times of a signal component which corresponds to a reference orifice location and of an actual sensed orifice location are processed by a computer to generate a speed error signal and a phase error signal, the speed error signal is substantially nulled by regulating flow of the liquid ink, and the phase error signal is precisely nulled by the auxiliary drive.

28 Claims, 9 Drawing Figures

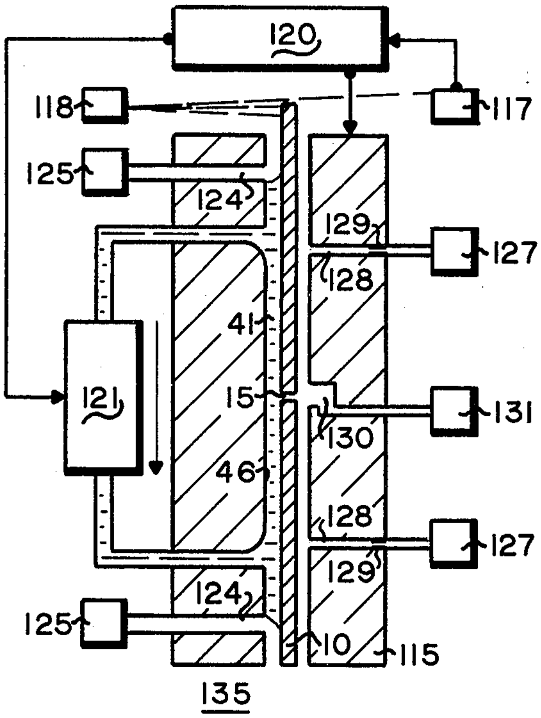
FIG 7
FIG 8
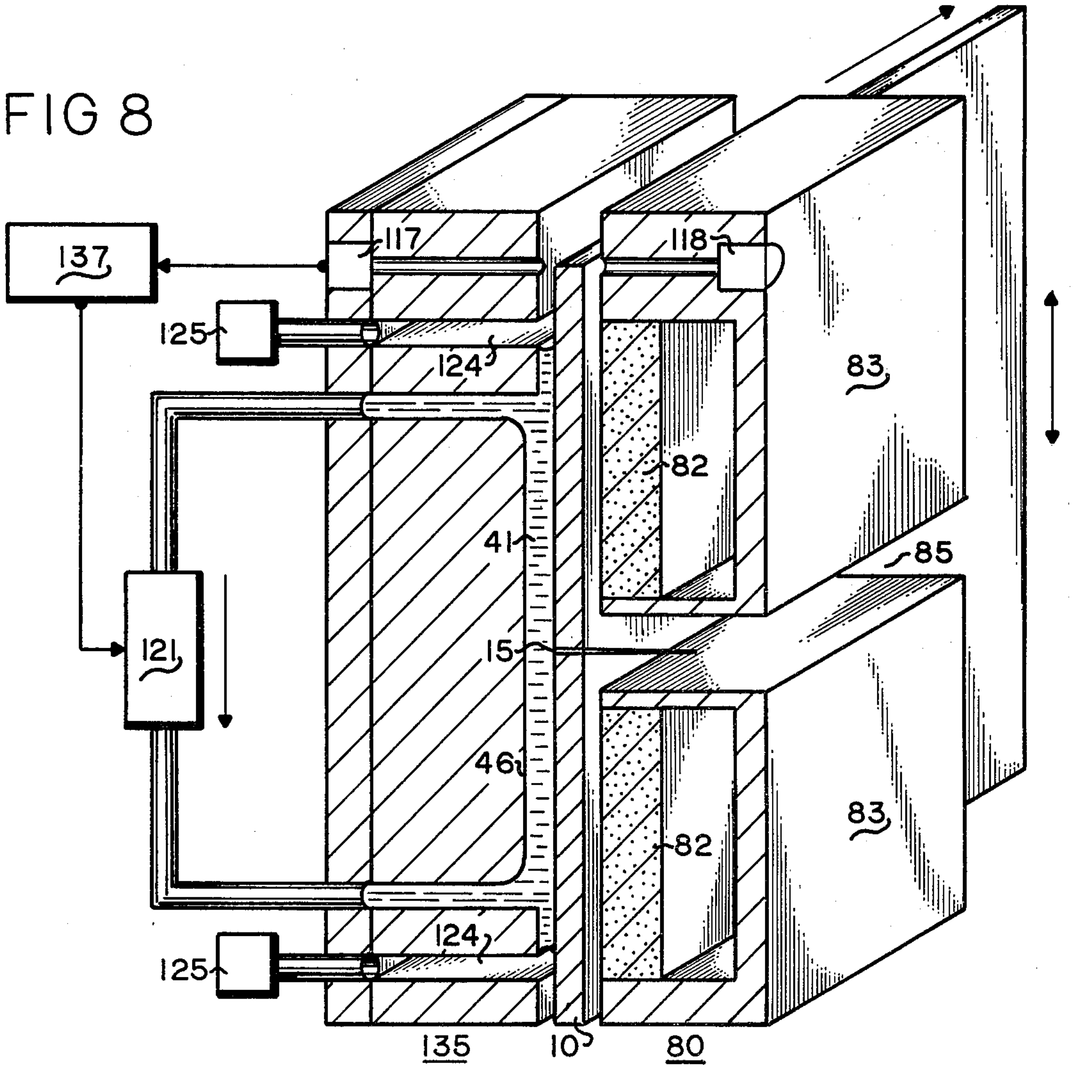

FLUID DRIVE FOR AN ORIFICE BAND INK JET PRINTER

BACKGROUND

The present application is a continuation-in-part of application Ser. No. 353,640 filed Mar. 1, 1982.

This invention relates to fluid drive servo systems which provide precise speed, phase, and alignment for an orifice band of an ink jet printer.

Ink jet printing, wherein a projected modulated column of ink drops is formed by selective charging of ink drops detaching from a jet followed by electrostatic deflection of charged drops, combines rapid drop formation with precise drop deposition on paper. When this ink jet process is combined with a traversing orifice band to sweep a plurality of the modulated ink drop columns across an advancing sheet of paper, the intrinsic rapid printing speed of the ink jet is enhanced while graphic quality is retained. Orifice band ink jet printers have a desirable distribution of motions consisting of a high frequency modulation of the ink drops, a rapid and constant linear motion of the orifice band, and an unrolling of paper at a moderate speed into a flat configuration for convenient printing on both sides, cutting, and assembly of a plurality of pages in facsimile publishing applications.

Within an ink source of the orifice band printer, an elongated acoustic transducer generates a periodic vibration which is coupled to the ink jets to induce uniform drop formation. In order to diminish coupling of interferring vibrations to the ink jets, the orifice band is constrained by air bearings to be separate from stationary solid structures. But previous means for driving the orifice band can be a source of extraneous noise. A nonslipping pulley drive, for example, can couple motor and other noise into the orifice band and surface wave reflections can occur at the line of contact to undesirably generate standing waves. A linear induction motor drive restricts the orifice band to suitably conductive materials and motor cogging effects can occur when such drives provide the principal driving force. It would, accordingly, be useful to provide a means for driving the orifice band which does not tend to disturb formation of uniformly sized ink drops.

In the transmission of large levels of power, fluid drives known as hydraulic couplings are used to reduce torsional vibrations during clutching. In one example, an automotive torque converter couples an internal combustion engine to drive wheels where speed is sensed for negative feedback to the engine to maintain constant speed. Such dynamic fluid drives, however, are not adaptable to fluid frictional driving of an isolated orifice band, do not provide phase regulation of a movable member, and do not provide the useful combination of a principal driving force for approximately regulating motion and a small auxiliary driving force for precisely regulating the motion.

OBJECTS OF THE INVENTION

It is a general object to provide for an isolated orifice band an improved drive which is not a source of extraneous noise.

It is another object to provide precise control over orifice band motion, said motion comprising speed, phase, and alignment at a right angle to the motion.

It is another object to use the liquid ink of the printer as a fluid to drive and align the orifice band.

It is another object to supplement principal driving power of the liquid ink with an auxiliary drive to provide the rapid and precise control of the orifice band.

SUMMARY

These and other objects and advantages which will become apparent are attained by the invention wherein an orifice band attains a predetermined speed and phase by a combination of forces which comprise a principal force of fluid friction and an auxiliary force which provides rapid response and precise nulling of motion errors. The predetermined orifice band speed and phase are attained by means of a servo system wherein a signal phase reference pulse is synchronized with an actual orifice phase which is sensed as an orifice passes a reference location. Occurrence times of the signal and actual phase are processed to generate an orifice band speed error signal and an orifice phase error signal. The fluid flow, which provides the principal driving force, is regulated to substantially null the speed error. A rapidly responding auxiliary drive is regulated to precisely null the phase error and thereby precisely regulate the speed by a supplemental force.

In a preferred embodiment, the orifice band is constrained by an air bearing on one side for motion in a fixed path separate from solid structures. On the other side of the orifice band, ink under pressure is confined by a counterpressure of air and is in laminar flow as the fluid which provides the principal driving force. The auxiliary drive is an electromagnet which induces electric reaction currents in the orifice band for a regulated smooth retarding force. The confined ink also has an upward component of regulated flow to overcome orifice band weight for alignment of the linear array of orifices. Accordingly, the orifice band operates as a noncontacting isolated system at a precise synchronous speed and phase without such problems as ink leakage, significant coupling to external sources of noise, and generation of extraneous vibrations from variable stresses and standing waves thereby improving ink drop formation and other printer operations.

An alternative auxiliary drive is a linear induction motor which uses the orifice band as an armature. Since the orifice band would be subject to a small cogging effect at the motor operating frequency, the auxiliary drive is used only to correct phase errors and the fluid drive power is adjusted so that power of the linear induction motor is minimized.

The preferred fluid drive is bounded by an ink supply and a return channel and may be located along the semicircular end portions of an orifice band loop. An alternative fluid drive comprises a plurality of adjacent fluid drive units each having a supply and return channel to reduce ink pressure variation along the orifice band thereby simplifying ink confinement. Such a plurality of fluid drive units is fabricated economically as a laminar structure comprising an ink supply channel and an ink return channel plate as a source of flowing ink for each of the fluid drive units, a flow surface plate to provide flow gaps along the orifice band, and a partition plate which separates the fluid drive units on one side and has channels along outer portions of the orifice band to seal ink therebetween by a counterpressure of air. Yet another alternative fluid drive uses a spinning cylinder to force ink to flow along the orifice band and is particularly useful for printers having an ink source along inner portions of an orifice band loop. For the present configuration of a facsimile printer having an air bearing along the inner portion of the loop, the spinning cylinder is itself an air bearing.

DESCRIPTION OF THE DRAWINGS

FIG. 7 is a schematic drawing partly in section showing a fluid drive combined with an auxiliary drive for maintaining alignment of the orifice band.

FIG. 8 is a perspective drawing showing a fluid drive for maintaining alignment of the orifice band.

FIG. 1 illustrates elementary features of an orifice band ink jet printer which embodies the fluid drive of the invention for horizontal drive and vertical alignment of the orifice band 10. The orifice band sweeps modulated ink drop columns across both sides of an advancing sheet of paper 11 to synthesize an image as lines of dots. The modulated ink drop columns represent binary information and are controlled by a digital signal such as time division multiplexed signal 13 comprising components designated $A_i$ which correspond to presence or absence of ink drops, synchronizing component B which functions in transformation of the serial signal to parallel operation, and synchronizing component C which is a position reference for the modulated ink drop columns. The orifice band ink jet printer under control of signal 13 is adapted to facsimile publishing where a combination of graphic quality and high output is of particular advantage. Performance of the orifice band ink jet printer derives from characteristics of the basic ink jet process which is also embodied in various commercial printers.

Figure 1:
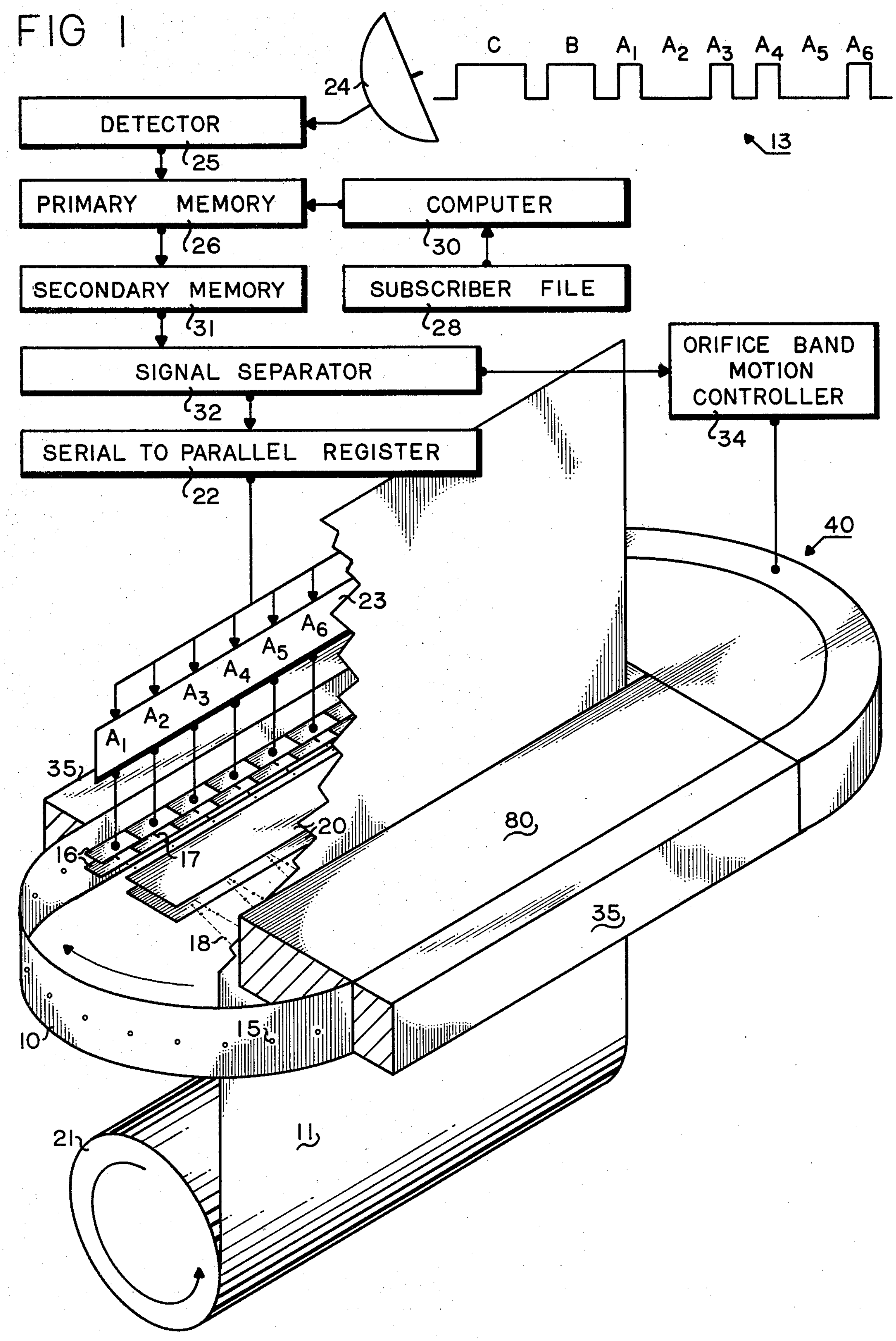
FIG. 1 is a schematic drawing of an orifice band ink jet publishing system showing a context in which the fluid drive of the invention is used.

The commercial ink jet printers may be operated in a binary mode and represented in their basic aspects by fixing the position of the orifice band 10 so that an orifice such as 15 is centered between a pair of charging electrodes such as 16. Liquid ink emerging as a jet 17 from the orifice 15 is periodically disturbed by acoustic means not shown to induce formation of uniformly sized drops 18 which separate from the jet between the charging electrodes. The jet couples capacitively with the charging electrodes 16 whereby their voltage induces on the jet a proportional charge of opposite polarity which is retained by the separating drops. Drops having a negative charge are deflected by a constant electrostatic field between deflecting electrodes 20 into a collector, not shown, for reuse. Uncharged drops, which constitute the modulated ink drop columns, travel undeflected onto the paper 11.

Ink jet printers having a plurality of simultaneously operating ink jets 17 and a corresponding plurality of charging electrodes 16 use the $A_i$ and B components of the signal 13 to control charge on the ink drops. Upon reception of a B signal component, serial to parallel register 22 enters the serial signal 13 for conversion to a corresponding parallel form which is transferred to amplifier 23 as the sequence illustrated by $A_1$ to $A_6$. According to the presence or absence of an $A_i$ signal component, the amplifier 23 transfers a positive or null voltage to the connected charging electrodes. In one type of commercial ink jet printer developed by Mead Corporation, a linear array of periodically disturbed jets emerges from an elongated ink source assembly comprising a stationary orifice plate, ink under pressure, and an elongated piezoelectric transducer to disturb the jets. The jets pass through charging electrodes, are selectively charged, and uncharged drops project onto paper. The printer has a very high output which is suitable for large scale central printing, but the many small annular charging electrodes are subject to obstruction and a plurality of the ink source assemblies are required for closely spaced dots.

Among ink jet printers, representative magnitudes are an ink pressure of 4.2 kg/cm$^2$ (60 psig), an orifice diameter of 0.0025 cm to 0.005 cm (1 mil to 2 mils), a charging electrode voltage of 150 volts, and a deflecting electrostatic field of 10,000 volts/cm. A description of ink jet printer principles may be found in R. G. Sweet, "High Frequency Oscillography with Electrostatically Deflected Ink Jets", AD 437,951, National Technical Information Service, 1964. A description of an ink jet printer having an orifice plate and parallel plate charging electrodes may be found in "I.B.M. Journal of Research and Development", Vol. 21, No. 1, pages 1–96, January 1977. A description of an elongated orifice plate and piezoelectric transducer may be found in Cha et al., U.S. Pat. No. 4,138,689.

Performance of an orifice band ink jet printer is appropriate for facsimile publishing on a neighborhood scale. Signals for a large number of pages are broadcast daily, are recorded for subsequent recall, and are transformed to print according to individual subscriber page selections in route order for convenient delivery. Broadcast signal 13, which represents page information and includes an identifying page code, is transmitted by antenna 24 to detector 25 for transfer to primary memory 26 and storage therein on videotape. A subscriber file 28, which includes each subscriber's page selections and delivery address, is scanned by computer 30 to transfer in route order page signals from the primary memory to secondary memory 31. As one portion of the secondary memory receives page signals, another portion controls operation of the printer by transferring the previously selected page signals into signal separator 32 at normal printing speed. The signal separator, which receives a continuous input of signals consisting of the $A_i$, B, and C signal components, transfers the $A_i$ and B signal components to the serial to parallel register for transfer to the amplifier 23 which connect the positive or null voltages to the charging electrodes 16. The signal separator also transfers C components of the signal 13 to orifice band motion controller 34 which regulates the orifice band 10 speed and orifice phase position by comparing the C component arrival time with the time of a pulse generated when an orifice passes an actual reference location, calculating speed and phase errors, generating corresponding speed and phase error signals, and regulating forces exerted on the orifice band to null the errors.

Facsimile publishing necessitates printing on both sides of the paper for economy which suggests the illustrated configuration of paper within the loop formed by the orifice band 10. The orifice band has two linear and two semicircular portions which are formed by air bearings along the inner periphery and will be described with drawings which include reference numeral 80. On the outer periphery, ink source 35 is positioned at the linear portions and provides ink at an appropriate pressure for ink jet formation and provides a means for generating a periodic disturbance which is propagated to the jets to control drop formation. A fluid drive assembly 40, representing several types which will be described, is preferably positioned along a portion of the semicircular path of the orifice band. Electromagnetic or other auxiliary drive assemblies, which respond rapidly to errors with corrective forces on the orifice band, are located along otherwise nonfunctioning portions of the orifice band. A vertical orifice band fluid drive assembly, which will be designated 135, provides a vertical component of ink flow and force so that the line of orifices 15 remains centered and may be located along otherwise nonfunctioning portions of the orifice band. Alternatively, the vertical component of ink flow may be located in the fluid drive 40 or the ink source 35. Upper and lower portions of the orifice band along the outer periphery have channels containing air at substantially ink pressure to prevent its leakage.

Further details relating to orifice band printers may be found in the following issued and pending patents of the applicant: U.S. Pat. No. 3,971,040 describes basic features of an orifice band printer; U.S. Pat. No. 3,972,053 describes transfer electrodes which are located and switch between the charging electrodes so that charge induced on a passing jet is not affected by a voltage difference between neighboring charging electrodes; U.S. Pat. No. 4,117,518 describes the signal and means for its generation and processing; and Ser. No. 353,640 describes means for sealing ink under pressure by a counterpressure of air.

A representative orifice band ink jet printer for facsimile publishing has the following characteristics: an ink drop repetition frequency of 100 KHz; a dot density and resolution of 100 picture elements/cm (254 pel/in); a resulting orifice band speed of 500 cm/sec (16.4 ft/sec); an orifice interval of 0.5 cm (0.2 in) which corresponds to 50 ink jets operating simultaneously across a page width of 25 cm (10 in); a printing time of 1.9 sec for a tabloid size page having a sight of 25×38 cm (10×15 in); a paper speed of 23 cm/sec (45 ft/min); and a maximum capacity of 90,900 pages daily (0.95 sec/page). A single orifice band printer operating over two shifts would serve 1,200 subscribers daily with a 50 page publication. The information content of one page is 9.5 megabits.

Figure 2:
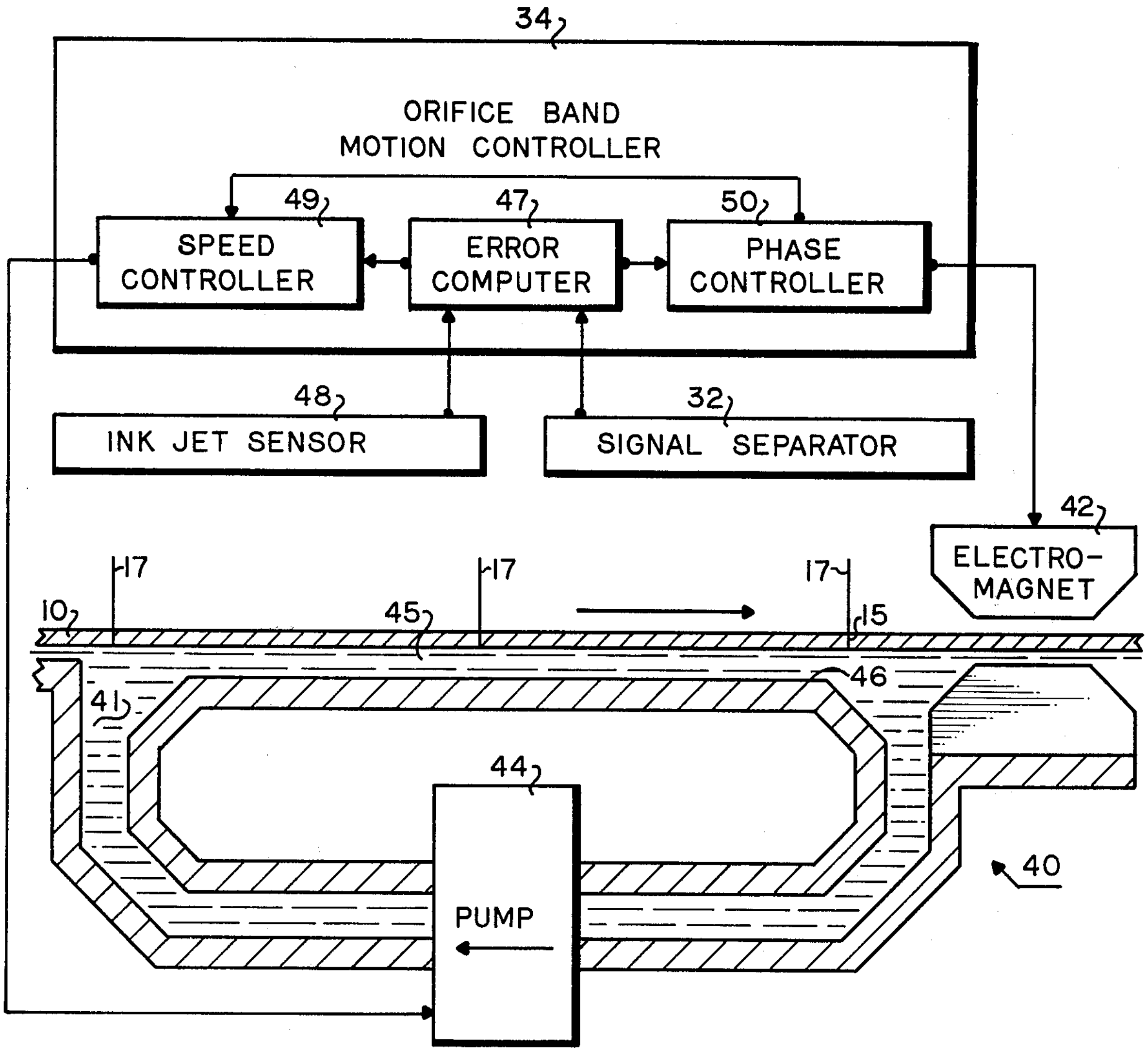
FIG. 2 is a schematic drawing partly in section showing a fluid drive servo system with an auxiliary drive according to the invention.

FIG. 2 illustrates a fluid drive assembly 40 as part of a servo system wherein motion of an orifice band 10 is predetermined by a signal. A flowing liquid ink 41 exerts on the orifice band 10 a principal driving force and an electromagnet 42 exerts an auxiliary force for rapid precision adjustment of the motion.

A pump 44 forces the ink 41 to circulate in a path which includes gap 45 between stationary surface 46 and the orifice band 10 thereby exerting a force thereon. The motor operated pump 44 includes in its operating range an ink flow which is sufficient to overcome all retarding forces on the orifice band at its synchronous speed. An electric current generated in the moving orifice band by the magnetic field of the electromagnet 42 reacts with the same magnetic field to develop in the orifice band a retarding force which is proportional to the square of the current through the electromagnet. The servo system comprising the pump 44, electromagnet 42, and orifice band motion controller 34 operates to null orifice band motion errors. The motion errors of orifice band speed and orifice position or phase are functions of occurrence times of the C component of signal 13 and of passage of an orifice 15 through a reference location. Error computer 47 receives C components of signal 13 from signal separator 32 and receives ink jet reference pulses from the reference location of optical ink jet sensor 48 as an ink jet 17 passes thereover. The orifice band speed error, $\Delta v$, generated by the error computer 47 is proportional to $1/\Delta T_1 - 1/\Delta T_2$ where $\Delta T_1$ is the time difference between consecutive C component pulses and $\Delta T_2$ is the time difference of consecutive reference location pulses. The negative orifice band speed error signal, $-\Delta v$, is transmitted to speed controller 49 which changes power transmitted to the pump 44 proportionally for a corresponding change of ink 41 flow. The orifice phase error signal, $\Delta P$, generated by the error computer 47 is proportional to the time difference between C component pulses and reference location pulses, $T_1 - T_2$. Since the magnetic retarding force is proportional to the square of electromagnet 42 current, a $-(\Delta P)^{\frac{1}{2}}$ signal is transmitted from the error computer 47 to orifice phase controller 50 which proportionally changes the electromagnet current. As the orifice band 10 attains an equilibrium null error motion state, the electromagnet current and ink flow are both reduced until the electromagnet current attains a predetermined minimum magnitude. The phase controller 50 transmits to the speed controller 49 a reset signal which results in a decrease of the force exerted by the flowing ink on the orifice band which is equal to the decrease of the electromagnet retarding force. The orifice band motion controller may be based on any conventional circuits and preferably comprises microprocessors for digital operations. The pulse intervals are converted into digital form and are processed by the error computer to generate digital error signals which are processed by the controllers 49 and 50. Within each of the controllers 49 and 50, the present signal which controls output is recalled from a register, modified according to the error signal, and returned to the register. The register output is transformed to a corresponding analogue power which causes appropriate forces to be induced on the orifice band.

The ink jets 17 are undeflected and enter a collector, not shown, when the fluid drive assembly 40 is normally located along an otherwise nonoperating portion of the orifice band path.

Within a gap, g, between the orifice band moving at a velocity, $v_g$, and a stationary surface, a fluid is subject to a stress, T, of fluid friction. For ordinary newtonian fluids such as air and aqueous ink in laminar flow, T is equal to the product of viscosity, u, and velocity gradient, dv/dy, so that $T=u\,dv/dy$. Planar configurations have a velocity gradient of constant magnitude so that $dv/dy=v_g/g$ throughout the gap and $T=uv_g/g$. The velocity of the orifice band, $v_g$, has been tentatively established at 500 cm/sec, the viscosity, u, of the liquid ink is about 0.01 poise, and the gap, g, is about 0.020 cm (8 mils) so that T=250 dynes/cm$^2$ (0.058 oz/in$^2$). The corresponding power is 0.012 watt/cm$^2$. The gap of 0.020 cm is a safe maximum for laminar flow under the Reynolds condition that the Reynolds number $\rho vg/u \leq 1{,}000$ which assures that turbulence will not occur to destabilize formation of uniform drops.

Figure 3A:
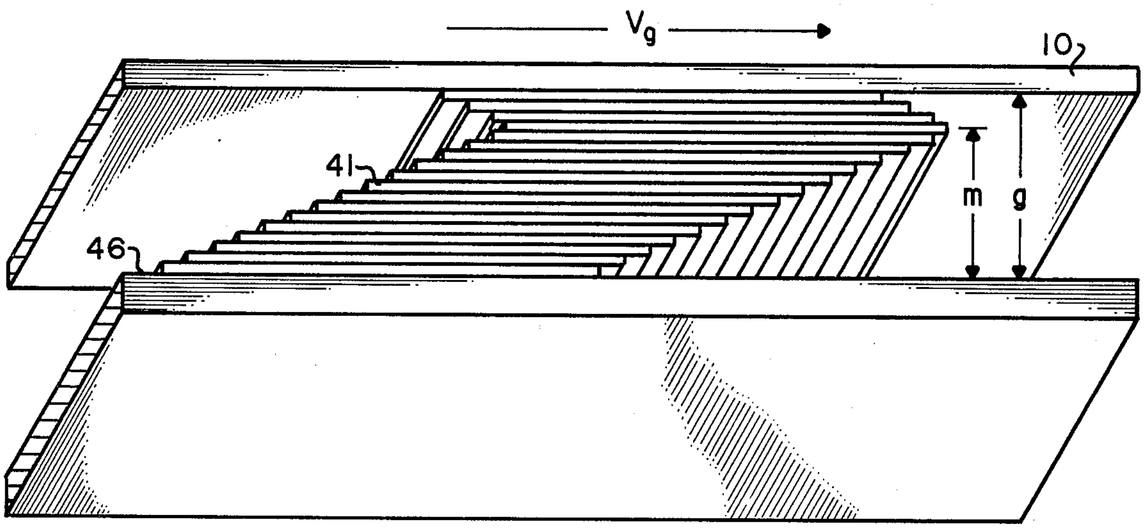
FIGS. 3*a* and 3*b* is a schematic representation of laminar flow in a fluid drive illustrating relationships among fluid velocity gradient and orifice band and fluid velocities.
Figure 3B:
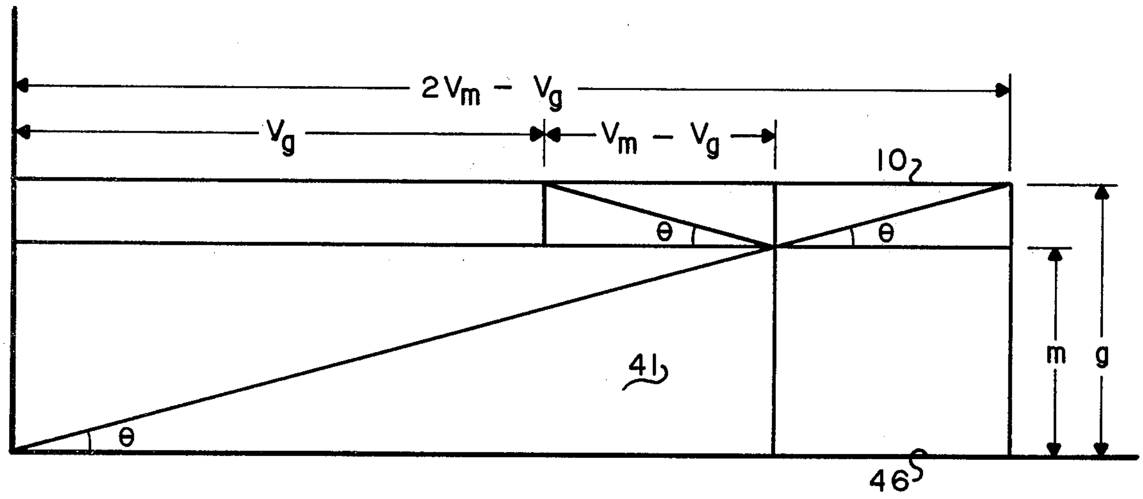

FIGS. 3*a* and 3*b* represent laminar flow in the gap when a driving pressure propels laminar elements such as 41 to exert a force on the moving orifice band. The velocity gradient, $dv/dy=T/u$, is integrated between the stationary surface 46 and a distance, m, at which fluid velocity is a maximum, $v_m$, with the result $v_m/m=T/u$. From similar triangles in FIG. 3*b*, $\theta=\tan^{-1}(dv/dy)$ and $v_m/m=(2v_m-v_g)/g$. Then $T/u=(2v_m-v_g)/g$ and $v_m=\frac{1}{2}[(T/u)g+v_g]$. The driving stress, T, is on the order of 500 dynes/cm$^2$ based on the retarding stress of 250 dynes/cm$^2$ and estimated ratios of the stressed orifice band areas. When $g=1.6\times10^{-2}$ cm (6.4 mils), $v_m=650$ cm/sec and the Reynolds condition is satisfied.

The driving stress, T, is developed by propelling the laminar elements of liquid ink 41 by a pressure differential, $\Delta P$. The driving force on the laminar elements is $F=g\Delta P$ and the frictional retarding force is $F=u(dv/dy)=T$. Then $\Delta P=T/g=3.12\times10^4$ dynes/cm$^2$ (0.45 psi) for each centimeter of length along the orifice band. A typical driving length along a semicircular portion of the orifice band is about 7 cm so that the corresponding pressure drop is $25\times10^4$ dynes/cm$^2$ (3.6 psi).

Figure 4:
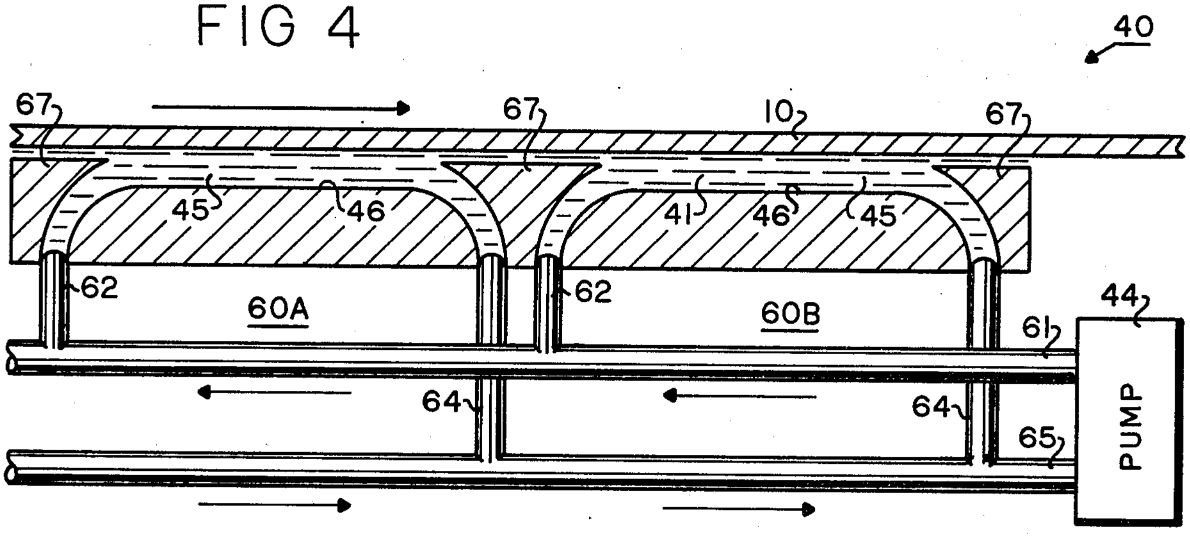
FIG. 4 is is a schematic drawing in section showing a plurality of fluid drive units.
Figure 5:
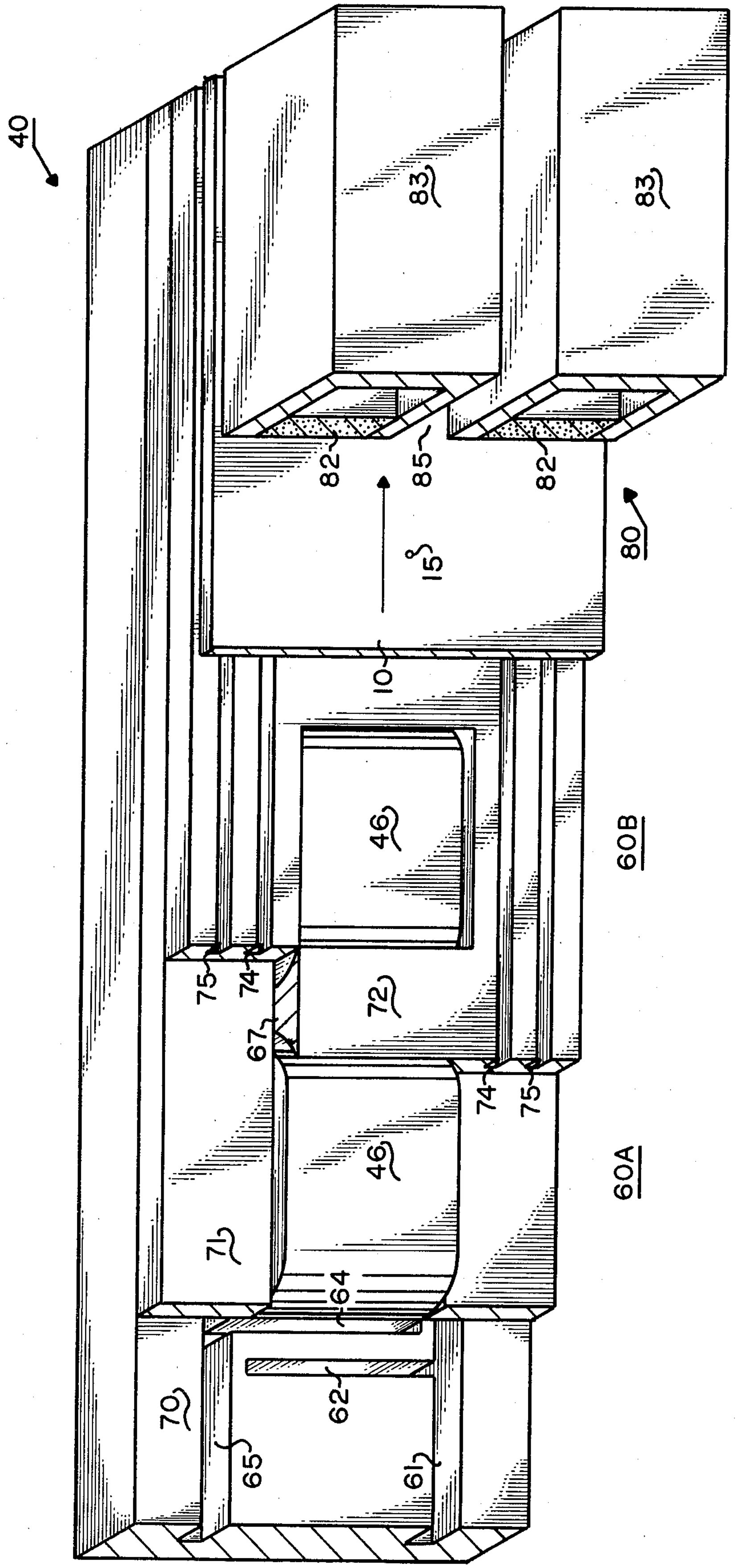
FIG. 5 is a perspective drawing of a fluid drive assembly having a plurality of fluid drive units, air channels for confining ink to central portions of the orifice band, and an air bearing assembly to constrain the orifice band to a path separate from solid structures. The fluid drive assembly is laminar for economical fabrication.

FIGS. 4 and 5 describe an alternative embodiment of a fluid drive assembly 40 comprising a plurality of fluid drive units 60A and 60B. The reduced length of each fluid drive unit reduces pressure differential therein thereby enabling simple confinement of ink to central portions of the orifice band 10.

In FIG. 4, pump 44 develops a regulated differential pressure to force ink 41 from supply main 61, through channels 62, through gaps 45 between stationary surfaces 46 and the orifice band 10, through channels 64, and into return main 65 which communicates with the supply main through the pump. Ink flow in a reverse direction is impeded by a relatively narrow separation between partition 67 and the orifice band 10 and is also impeded by dynamic pressures developed by the shape of the partition 67 which directs flow of the ink along the stationary surface 46. The pump 44 is regulated to force ink through the gaps 45 to exert on the orifice band 10 a force which is sufficient to overcome all retarding forces on the orifice band at its synchronous speed.

In FIG. 5, the plurality of fluid drive units such as 60A and 60B comprise an assembly of laminar structures for economical fabrication. Channel plate 70 has formed on its forward side supply main 61 which branches into supply channels 62 and return main 65 which branches into return channels 64. On the reverse side which is not shown, a pump attaches to connectors communicating with the supply and return mains 61 and 65 to develop a differential pressure in ink therebetween. Flow surface plate 71 includes curved stationary surfaces 46 which join the channel plate 70 to abut supply and return channels 62 and 64. Partition plate 72 includes on its reverse side the partitions 67 of FIG. 4 which join the channel plate 70 and includes on its forward side ink channels 74 and air channels 75 which function as ink seals by confining ink within their boundaries with a counterpressure of air. The ink channels 74 connect to a source of ink, not shown, at a constant pressure which approximates the average ink pressure along the stationary surfaces 46. The air channels 75 are connected to a source of compressed air, not shown, at a constant pressure which is slightly above the pressure of ink in the ink channels 74 to prevent the ink from leaking into and beyond the air channels. Without contacting stationary surfaces, the orifice band 10 moves in a separation between the partition plate 72 and air bearing assembly 80. The air bearing assembly includes a conventional static air bearing 82 fabricated from a sintered material having intergranular separations which impede air flow and an enclosure 83 within which compressed air is maintained at a pressure which is predetermined for a desired balance of forces on the orifice band. Gap 85 enables ink jets emerging from orifices 15 to pass into a collector, not shown. The orifice band 10 is constrained to its path by a high stiffness of the pneumatic restoring force. The stiffness is the ratio of air pressure range to displacement in the gap 45 which is about $1.4\times10^6$ gm/cm$^3$ or $5\times10^4$ lb/in for a square inch of the orifice band. The orifice band is driven by ink which flows from the supply main 61, through channels 62, through the gap between the stationary surfaces 46 and the orifice band 10, through the channels 64, and into the return main 65. The channel plate 70, flow surface plate 71, and partition plate 72 may be fabricated by such known means as conventional machining, spark erosion, electroforming, photochemical etching, or by moulding.

Figure 6:
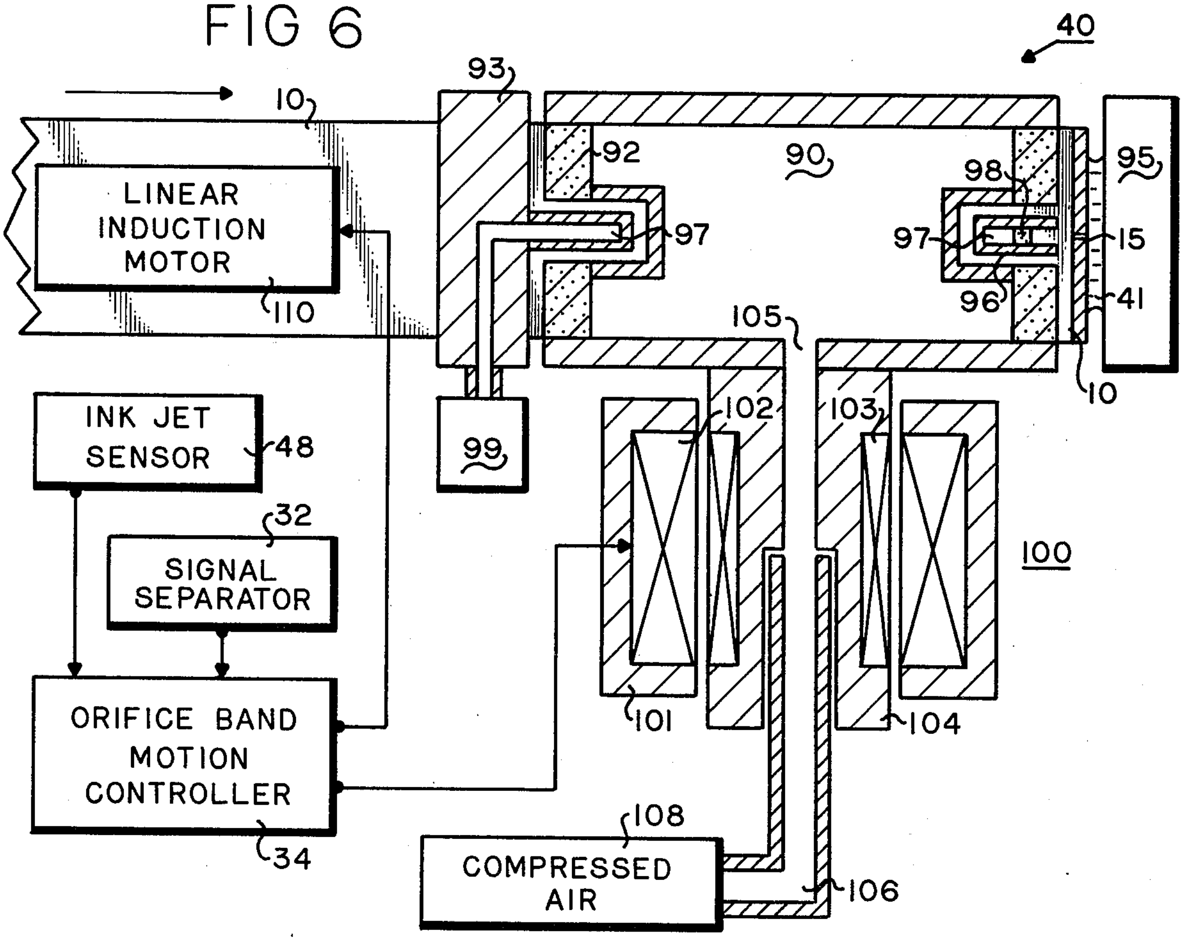
FIG. 6 is a schematic drawing partly in section showing a spinning cylindrical air bearing as an alternative fluid drive and a linear induction motor as an alternative auxiliary drive.

FIG. 6 shows an alternative embodiment of a fluid drive assembly 40 wherein a spinning cylinder exerts a force on the orifice band by friction of a fluid which may be air, as illustrated, or may be liquid ink. In a facsimile publishing configuration where ink jets project inward, the fluid is air. The viscosity of air, however, is only one-fiftieth of the viscosity of the liquid ink so that the velocity gradient must be increased accordingly in order to develop a driving force which exceeds the retarding force of ink. The spinning cylinder functions as an air bearing to maintain the requisite small gap.

Orifice band 10 loops around a cylindrical air bearing assembly 90 which spins at a high velocity to shear air in a gap between the orifice band 10 and air bearing 92 thereby exerting a driving force on the orifice band. A thrust bearing block 93 is positioned to maintain a force against the orifice band which combines with ink and air forces thereon to determine the gap magnitude. Ink 41 from ink source 95 emerges from orifices such as 15 as jets and enters stationary ink collector 96 having therein a channel 97 through which the ink and air from the adjacent air bearing 92 flow through porous plug 98 for return to ink reservoir 99.

The air bearing assembly 90 is forced to rotate by an electric motor 100 comprising a field coil assembly 102 and an armature 103 on shaft 104 which is attached to the air bearing assembly. The motor 100 is an induction type such as a synchronous hysteresis motor having a rotational velocity proportional to input frequency. The shaft 104 includes rotating conduit 105 which is adjacent to stationary conduit 106 to connect compressed air source 108 to the air bearing assembly 90.

The air bearing assembly 90 and a linear induction motor 110 exert on the orifice band 10 a driving force which is regulated to null errors of orifice band speed and orifice position. The errors are functions of occurrence times of actual and signal reference orifice positions. The actual occurrence time is generated as a pulse when an ink jet passes ink jet sensor 48. The signal reference occurrence time corresponds to the arrival of a C component of signal 13 which is selected by signal separator 32. These occurrence times are processed by orifice band motion controller 34 to develop orifice band speed and orifice position error which control power outputs to the motors 100 and 110. The power output to the synchronous motor 100 has a frequency change in proportion to the negative of the orifice speed error signal. The power output to the linear induction motor 110 has a magnitude in proportion to the negative of the orifice position error signal. Orifice band motion is thus regulated as part of a servosystem which can be modified to accommodate alternative drive motors. When an air motor is used, for example, the orifice band motion controller 34 operates an air regulator valve which communicates with the air motor to null the error signal. A representative air motor as an alternative for motor 100 is an air turbine. A representative air motor as an alternative to the linear induction motor 110 is an air jet directed along the orifice band.

Flow between the air bearing 92 and orifice band 10 is laminar. A comparison with the Reynolds number cited for aqueous ink shows that decreased inertial effects of reduced density dominate decreased damping effects of lower viscosity. In order to determine angular velocity of the cylindrical air bearing assembly 90 needed to develop a driving force sufficient to overcome retarding forces on the orifice band, the stress equation, $T=uv/g$, is used. Equating driving and retarding forces, $(v_d/v_r)=(u_r/u_d)\times(g_d/g_r)\times(A_r/A_d)$ where the subscripts "r" and "d" refer to retarding and driving parameters respectively and "A" is the orifice band area on which the stress is exerted. Predetermined parameters are orifice band speed, $v_r=500$ cm/sec, viscosities of liquid ink and air, $(u_r/u_d)=50$, and the outer radius "r" of the air bearing 92 which is the same as the distance between the orifice band and paper of 2.54 cm (1 in). Since $v_d=25{,}000$ cm/sec $(g_d/g_r)\times(A_r/A_d)$ and $f(\text{RPM})=v_d/60(2\pi r)$, $f(\text{RPM})=94{,}000(g_d/g_r)\times(A_r/A_d)$. The gap ratio, $(g_d/g_r)$, can be about 1/5 as the gap is reduced from 0.005 cm (2 mils) at the ink source to 0.001 cm (0.4 mils) at the air bearing 92 when air pressure therein is reduced and the air bearing is precision ground. The area ratio, $(A_r/A_d)$, can be about $\frac{1}{2}$ as a result of an assembly 90 at both ends of the orifice band loop and a smaller width of sheared ink than sheared air. The angular velocity of the assembly 90 under these conditions is 9,400 RPM.

An orifice band ink jet printer may be oriented with the orifice band traversing in a horizontal or a vertical plane. Traverse in the horizontal plane requires an upward force to be exerted on the orifice band to support its weight. In FIG. 7, ink is forced to flow upward to provide the principal force supporting the orifice band 10 and a linear induction motor 115 exerts an auxiliary rapidly responding force thereby actively maintaining a predetermined stationary alignment of the ink jets.

A signal corresponding to orifice band vertical position is generated by a photodetector 117, such as a phototransistor, as the orifice band interrupts portions of a light beam projected by light source 118, such as a light emitting diode. The signal is transferred from the photodetector 117 to orifice band vertical position controller 120 which transforms the signal into power outputs so that vertical position error is nulled according to known servo system principles. One output of the controller 120 connects to pump 121 to circulate ink 41 in a path which includes a gap between stationary surface 46 and the orifice band 10 thereby exerting an upward force thereon. Another output of the controller 120 connects to the linear induction motor 115 which exerts an upward or a downward force on the orifice band 10. If the orifice band 10 drifts downward from its predetermined aligned position, more light enters the photodetector 117 whose output the controller 120 transforms into a negative error signal and applies a proportional power to the pump 120 and the linear induction motor 115. The result of the applied power is a corresponding upward motion which nulls the error.

The ink 41 is prevented from leaking beyond the orifice band 10 by a counterpressure of air in air channels 124 which is regulated at substantially the pressure of adjacent ink by regulator valves 125. The linear induction motor 115 is located in a position normally occupied by an air bearing and is modified to include functions thereof. Sources of compressed air 127 connect to tubes 128 having therein constrictions 129 whereby the air pressure between the linear induction motor 115 and the orifice band 10 varies to stabilize its path.

FIG. 8 illustrates a preferred structure for the fluid drive for vertical alignment of the orifice band. Vertical variation of the orifice band in the light beam between light source 118 and photodetector 117 causes a change of the signal received by orifice band vertical position controller 137 which transmits power to pump 121 to restore the signal from the photodetector to a predetermined setpoint level by changing the vertical position of the orifice band.

As an illustration of design parameters, four vertical drive assemblies 135 each having a width of 2.5 cm and an effective height of 0.5 cm are positioned along the orifice band. An orifice band has a thickness of 0.010 cm (3.9 mils), a height of 1 cm, a perimeter of 75 cm for a volume of 0.75 $cm^3$, is composed of nickel having a density of 8.9 $gm/cm^3$, and has a weight of 6.7 gm. The four vertical drive assemblies have a combined driving surface of 5 $cm^2$ so that the required upward stress is $1.3\times10^3$ $dynes/cm^2$. For a gap of 0.0125 cm (5 mils), $v_m=Tg/2u=812$ cm/sec which is in the region of laminar flow. The corresponding pressure differential across 0.5 cm, $T/2g$, is $5\times10^4$ dynes (0.7 psi).

In an alternative configuration of an orifice band vertical drive, such as is illustrated in the cited copending application Ser. No. 353,640 for an ink source assembly 35, vertical flow of ink is distributed along the orifice band 10 as an additional component of flow. The weight of 1.0 $cm^2$ of the orifice band is 89 mg and the equivalent upward stress, T, is 87 $dynes/cm^2$. For an ink source assembly 35 having a gap of 0.005 cm (2 mils), the maximum velocity in the gap, $v_m=Tg/2u$, is 22 cm/sec. The corresponding pressure differential across a width of 0.5 cm is $T/2g=8{,}700$ $dyne/cm^2$ (0.125 psi).

While several specific embodiments are described in detail herein, various modifications can be made without departing from the spirit and scope of the invention and it is intended that all such modifications be interpreted as contemplated by the invention.

I claim:

1. A method for attaining a predetermined motion of an endless band, comprising the steps of:

constraining the endless band to a path wherein the endless band is separate from solid structures, generating an error signal representing a difference between actual motion of the endless band and predetermined reference motion thereof, regulating flow of a fluid which is adjacent to the endless band to exert a fluid force thereon in response to the error signal, and exerting an auxiliary force on the endless band so that the combination of the fluid force and the auxiliary force nulls the error signal.

2. The method of claim 1 comprising the additional step of restoring the auxiliary force to a predetermined minimum magnitude by changing the auxiliary and fluid forces by similar magnitudes in opposite directions to maintain substantially the same total force on the endless band thereby reducing power expended by the auxiliary force.

3. The method of claim 2 wherein the motion comprising speed and phase are synchronous with a signal and the method comprises the additional steps of:

operating on a position reference component of the signal and on an actual position of indicia on the movable member to compute therefrom a speed error signal and a phase error signal, regulating the fluid flow in response to the speed error signal, and regulating the auxiliary force in response to the phase error signal.

4. A process for operating an orifice band in an ink jet printer, comprising the steps of:

constraining the orifice band to a path wherein the orifice band is separate from solid structures, and regulating flow of a fluid in a gap between the orifice band and at least one of the solid structures to attain predetermined motions of the orifice band.

5. The process of claim 4 wherein the predetermined motion include constant alignment of the orifice band and the fluid is regulated to flow across the orifice band to exert an upward force thereon, said upward force being substantially the same as the downward weight component of the orifice band.

6. The process of claim 4 wherein the predetermined motion correspond to a constant orifice band speed and the fluid is regulated to flow along the orifice band to substantially maintain the constant speed.

7. The process of claim 6 wherein the fluid is a liquid ink and the step of regulating the flow comprises regulating power to a pump to circulate the ink in a path which includes the gap adjacent to the orifice band to maintain the constant orifice band speed.

8. The process of claim 6 wherein the solid structure comprises a cylinder and the fluid is forced to flow across the orifice band by the additional step of spinning the cylinder.

9. The process of claims 6, 7, or 8 comprising the further step of exerting an auxiliary force on the orifice band to attain a predetermined phase.

10. The process of claim 9 comprising the further step of reducing the auxiliary force to a predetermined minimum while increasing the force exerted by the fluid on the orifice band thereby enabling the auxiliary force to operate over a wide range with small average power.

11. The process of claim 4 wherein the step of regulating flow of the fluid comprises generating an error signal from actual and reference positions of the orifice band and regulating the flow to substantially null the error signal.

12. A fluid drive system for attaining a synchronous speed and phase of a movable member, comprising:

a movable member separated from solid structures by a fluid bearing, a fluid adjacent to the movable member and means for inducing regulated flow of the fluid in response to power from a controller thereby exerting a regulated fluid force on the movable member, an auxiliary drive for exerting a supplementary regulated force on the movable member, means for operating on a reference position signal and an actual position signal of the movable member to generate a speed error signal and a phase error signal, a controller responsive to the speed error signal for regulating power to said means for inducing flow to null the speed error signal, and a controller responsive to the phase error signal for regulating power to the auxiliary drive to null the phase error signal.

13. The fluid drive system of claim 12 wherein the movable member is an endless band.

14. The fluid drive of claim 12 wherein the movable member is electrically conductive and the auxiliary drive is an electromagnet.

15. The fluid drive system of claim 12 wherein the movable member is electrically conductive and the auxiliary drive is a linear induction motor.

16. A fluid drive for an isolated endless band, comprising:

an endless band separated from solid structures by a fluid bearing, a fluid in a gap between the endless band and a solid structure, and means for inducing the fluid in the gap to flow at a speed which is sufficient to exert a fluid driving force on the endless band to attain predetermined positions thereof.

17. The fluid drive of claim 16 wherein the means for inducing the fluid in the gap to flow comprises a spinning cylinder as the solid structure adjacent to the gap.

18. The fluid drive of claim 17 wherein the spinning cylinder is a fluid bearing.

19. The fluid drive of claim 18 wherein the fluid bearing is a gas bearing.

20. The fluid drive of claim 16 wherein the fluid in the gap is a liquid and the means for inducing its flow is a fluid drive unit comprising a pump, the gap between a stationary solid structure and the endless band, and conduits connecting the pump to both ends of the gap whereby the liquid circulates in a path which includes the gap to exert the fluid driving force on the endless band.

21. The fluid drive of claim 20 wherein the fluid drive unit comprises a laminar structure which includes:

a liquid channel plate having a liquid supply channel and a liquid return channel connnecting through the conduits to the pump, a flow surface plate adjacent to the liquid channel plate and having a flow surface connecting between the liquid supply channel and the liquid return channel to form the gap through which the liquid flows to exert the force on the endless band, and a partition plate which terminates the fluid drive at its outer boundaries and includes channels adjacent to outer portions of the endless band to seal the liquid therebetween by a counterpressure of a gas.

22. The fluid drive of claim 21 wherein the fluid drive unit comprises a linear array of fluid drive units each connecting to the pump and separated from an adjacent fluid drive unit by a partition.

23. The fluid drive of claim 20 wherein the fluid drive unit comprises a linear array of fluid drive units each connecting to the pump and separated from an adjacent fluid drive unit by a partition.

24. The fluid drive of claims 16, or 20 wherein the endless band is an orifice band and further comprises:

means for generating an orifice band speed error signal and a phase error signal, an auxiliary drive for exerting a supplementary force on the orifice band, a controller responsive to the speed error signal for regulating the means for inducing flow in the gap to substantially null the speed error signal, and a controller responsive to the phase error signal for regulating the auxiliary drive to precisely null the phase error signal and thereby precisely null the speed error signal.

25. The fluid drive of claim 24 wherein the auxiliary drive is an electromagnet.

26. The fluid drive of claim 24 wherein the auxiliary drive is a linear induction motor.

27. The fluid drive of claim 24 further comprising:

means for sensing an alignment error of the orifice band in a direction perpendicular to its traverse and for generating an alignment error signal therefor, and means for regulating flow of the fluid in the gap across the orifice band to null the alignment error signal.

28. The fluid drive of claim 24 further comprising an auxiliary alignment drive for exerting a supplementary force across the orifice band for rapid response to null the alignment error signal.

* * * * *